US012577497B2

(12) United States Patent
Henderson Villalpando et al.

(10) Patent No.: US 12,577,497 B2
(45) Date of Patent: Mar. 17, 2026

(54) CLEANSING COMPOSITIONS AND METHODS FOR THE SAME

(71) Applicant: Colgate-Palmolive Company, New York, NY (US)

(72) Inventors: Joshua Gerardo Henderson Villalpando, Mexico City (MX); Simón Elías Santiago, Mexico City (MX); Jorge Antonio Maldonado Ortega, Mexico City (MX); Estela Junued Gómez Segura, Chimalhuacán (MX)

(73) Assignee: Colgate-Palmolive Company, New York, NY (US)

( * ) Notice: Subject to any disclaimer, the term of this patent is extended or adjusted under 35 U.S.C. 154(b) by 164 days.

(21) Appl. No.: 18/542,196

(22) Filed: Dec. 15, 2023

(65) Prior Publication Data

US 2024/0199979 A1 Jun. 20, 2024

Related U.S. Application Data

(60) Provisional application No. 63/476,283, filed on Dec. 20, 2022.

(51) Int. Cl.

| | |
|---|---|
| ***C11D 1/14*** | (2006.01) |
| ***C11D 1/75*** | (2006.01) |
| ***C11D 1/90*** | (2006.01) |
| ***C11D 3/20*** | (2006.01) |
| ***C11D 3/37*** | (2006.01) |

(52) U.S. Cl.

CPC .............. *C11D 1/143* (2013.01); *C11D 1/146* (2013.01); *C11D 1/75* (2013.01); *C11D 1/90* (2013.01); *C11D 3/201* (2013.01); *C11D 3/2086* (2013.01); *C11D 3/3707* (2013.01)

(58) Field of Classification Search

None

See application file for complete search history.

(56) References Cited

U.S. PATENT DOCUMENTS

| | | | | |
|---|---|---|---|---|
| 6,191,315 | B1 | 2/2001 | Thankachan et al. | |
| 7,297,671 | B2 | 11/2007 | Thankachan et al. | |
| 7,582,598 | B2 | 9/2009 | Hecht et al. | |
| 8,022,028 | B2 | 9/2011 | Szewczyk et al. | |
| 8,895,492 | B2 | 11/2014 | Tarng et al. | |
| 9,862,913 | B2 | 1/2018 | Hardy | |
| 9,969,960 | B2 | 5/2018 | Perez-Garcia et al. | |
| 10,052,283 | B2 | 8/2018 | Tae et al. | |
| 10,329,521 | B2 | 6/2019 | Zuniga et al. | |
| 2013/0267451 | A1* | 10/2013 | Hardy .................... | C11D 3/042 510/237 |

FOREIGN PATENT DOCUMENTS

| | | |
|---|---|---|
| WO | 2008/074667 | 6/2008 |
| WO | 2015/178902 | 11/2015 |
| WO | 2023/034373 | 3/2023 |

OTHER PUBLICATIONS

International Search Report and the Written Opinion of the International Searching Authority issued in International Application PCT/US2023/084314 mailed Apr. 9, 2024.

* cited by examiner

*Primary Examiner* — Katie L. Hammer

(57) ABSTRACT

Aqueous cleansing compositions and methods for the same are disclosed herein. The aqueous cleansing compositions may include an aqueous base and a surfactant system. The surfactant system may include a plurality of surfactants dispersed in the aqueous base. The plurality of surfactants may include one or more anionic surfactants, one or more amphoteric surfactants, one or more nonionic surfactants, or a combination thereof. The aqueous cleansing composition may have a viscosity of from about 500 cP to about 1300 cP.

20 Claims, No Drawings

CLEANSING COMPOSITIONS AND METHODS FOR THE SAME

CROSS-REFERENCE TO RELATED APPLICATION

This application claims the benefit of priority from U.S. Provisional Application No. 63/476,283, filed Dec. 20, 2022, the contents of which are hereby incorporated herein by reference in their entirety.

BACKGROUND

For cleansing products or compositions, such as hand dishwashing liquids, stability (e.g., clarity and homogeneity) and viscosity are important factors contributing to consumers' perception thereof. The desired viscosity expected by the consumer should not be too thick or too thin, and the product or composition thereof should be visually appealing with respect to clarity. Other factors considered by consumers for cleansing products or compositions thereof include cleansing efficacy or performance and foam generation. Cleansing performance may be improved by improving the efficacy of the cleansing composition for oil emulsification. Improved foam generation, while minimally related to improved cleansing performance, provides a visual cue that gives consumers the impression or perception of improved cleaning performance. As such, it is desirable for flash foam or foam generated upon agitation to be stable and in relative high volumes.

What is needed, then, are improved cleansing products or cleansing compositions thereof that provide improved cleansing performance and improved consumer perception.

BRIEF SUMMARY

This summary is intended merely to introduce a simplified summary of some aspects of one or more implementations of the present disclosure. Further areas of applicability of the present disclosure will become apparent from the detailed description provided hereinafter. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing an aqueous cleansing composition including an aqueous base and a surfactant system. The surfactant system may include a plurality of surfactants dispersed in the aqueous base, and the plurality of surfactants may include one or more anionic surfactants, one or more amphoteric surfactants, one or more nonionic surfactants, or a combination thereof. The aqueous cleansing composition may have a viscosity measured at about 25° C. of from about 500 cP to about 1300 cP.

In at least one implementation, the surfactant system includes a combination of the one or more anionic surfactants, the one or more amphoteric surfactants, and the one or more nonionic surfactants.

In at least one implementation, the one or more anionic surfactants may include an alkyl sulfonate, an alkyl ethoxy sulfate, a salt thereof, or a combination thereof, and optionally, the one or more anionic surfactants may include an alkyl sulfonate and an alkyl ethoxy sulfate or a salt thereof.

In at least one implementation, the alkyl sulfonate may include a branched alkyl benzene sulfonate or a linear alkyl benzene sulfonate, optionally, a sodium linear alkyl benzene sulfonate, further optionally, sodium dodecyl benzene sulfonate (DDBS).

In at least one implementation, the alkyl ethoxy sulfate or a salt thereof may include a fatty acid ethoxylate sulfate, optionally, C12-C15 alkyl ethoxysulfate with 1 to 3 ethoxylate groups per molecule, such a 1 ethoxylate group per molecule, or a salt thereof, further optionally, the fatty acid ethoxylate sulfate may include sodium lauryl ether sulfate (SLES).

In at least one implementation, the one or more anionic surfactants may be present in an amount of from about 16 to about 26 wt %, about 18 wt % to about 26 wt %, about 20 wt % to about 24 wt %, about 21 wt % to about 22 wt %, about 16 wt %, or about 22 wt %, based on the total weight of the aqueous cleansing composition.

In at least one implementation, the DDBS may be present in an amount of from about 12 wt % to about 18 wt %, about 13 wt % to about 17 wt %, about 14 wt % to about 16 wt %, or about 15 wt %, based on the total weight of the aqueous cleansing composition. In at least one implementation, the DDBS may be present in an amount of from about 6 wt % to about 18 wt %, about 7 wt % to about 16 wt %, about 11 wt % to about 15 wt %, about 11 wt % to about 12 wt %, about 12 wt %, about 7 wt %, about 7.5 wt %, or about 16 wt %, based on the total weight of the aqueous cleansing composition.

In at least one implementation, the SLES may be present in an amount of from about 4 wt % to about 10 wt %, about 5 wt % to about 9 wt %, about 6 wt % to about 8 wt %, or about 7 wt %, based on the total weight of the aqueous cleansing composition. In at least one implementation, the SLES may be present in an amount of from about 6 wt % to about 12 wt %, about 7 wt % to about 10 wt %, about 8 wt % to about 10 wt %, about 8 wt %, about 8.5 wt %, about 9 wt %, or about 10 wt %, based on the total weight of the aqueous cleansing composition. In at least one implementation, the cleansing composition disclosed herein comprises anionic surfactants that consist of DDBS and SLES.

In at least one implementation, the one or more amphoteric surfactants may include a betaine-based surfactant, an amine oxide surfactant, or a combination thereof. Optionally, the betaine-based surfactant may include one or more of imidazoline-based betaines, alkyl dimethyl aminoacetic acid betaines, fatty acid amide propyl betaines, sulfobetaines, or a combination thereof, further optionally, the betaine-based surfactant may include lauramidopropyl betaine, further optionally, the amine oxide surfactant may include lauramidopropylamine oxide (lauryl/myristyl amidopropyl amine oxide or "LMDO"), further optionally, the amphoteric surfactants may include cocoamidopropyl betaine, lauramidopropyl betaine or lauramidopropylamine oxide. In at least one implementation, the one or more amphoteric surfactant may include LMDO. In at least one implementation, the cleansing composition disclosed herein comprises an amphoteric surfactant that consists of LMDO. In at least one implementation, the one or more amphoteric surfactant may include betaine. In at least one implementation, the cleansing composition disclosed herein comprises an amphoteric surfactant that consists of betaine.

In at least one implementation, the one or more amphoteric surfactants may be present in an amount of from greater than 0 wt % to about 6 wt %, about 1 wt % to about 5 wt %, about 2 wt % to about 4 wt %, about 3 wt % to about 4 wt %, about 3.5 wt %, about 3 wt %, or about 2 wt %, based on the total weight of the aqueous cleansing composition.

In at least one implementation, the one or more nonionic surfactants may include a reaction product of a C9-C15 or a C9-C11 alkanol and 2.5 to 10 moles of ethylene oxide, a reaction product of a C12-C13 alkanol and 6.5 moles of ethylene oxide, a reaction product of a C12-C15 alkanol and 12 moles of ethylene oxide, or a reaction product of a C14-C15 alkanol with 13 moles ethylene oxide, preferably a reaction product of a C9-C11 alkanol ethoxylated and 8 moles of ethylene oxide, further optionally, the nonionic surfactants may include NEODOL® 91-8, an alcohol ethoxylate, which is a C9-C11 alcohol ethoxylated with 8 moles of ethylene oxide per mole of alcohol ("C9-C11 alcohol ethoxylate, 8 EO"). In at least one implementation, the cleansing composition comprises a nonionic surfactant that consists of a C9-C11 alcohol ethoxylated with 8 moles of ethylene oxide per mole of alcohol, e.g., NEODOL® 91-8.

In at least one implementation, the one or more nonionic surfactants may be present in an amount of from greater than 0 wt % to about 4 wt %, about 0.5 wt % to about 3.5 wt %, about 1 wt % to about 3 wt %, about 1.5 wt % to about 2.5 wt %, or about 2 wt %, based on the total weight of the aqueous cleansing composition.

In at least one implementation, the surfactant system may include a combination of sodium lauryl ether sulfate (SLES), sodium dodecyl benzene sulfonate (DDBS), lauramidopropyl betaine or lauramidopropylamine oxide, and a reaction product of a C9-C11 alkanol ethoxylated and 8 moles of ethylene oxide in a weight ratio of about 3.5 to about 7.5 to about 1.6 to about 1, respectively. In at least one implementation, the surfactant system may include a combination of sodium lauryl ether sulfate (SLES), sodium dodecyl benzene sulfonate (DDBS), lauramidopropylamine oxide, and a reaction product of a C9-C11 alkanol ethoxylated and 8 moles of ethylene oxide in a weight ratio of about 5 to about 6 to about 2 to about 1, respectively, such as about 4.9 to about 5.8 to about 1.7 to about 1. In at least one implementation, the surfactant system consists of a combination of sodium lauryl ether sulfate (SLES), sodium dodecyl benzene sulfonate (DDBS), lauramidopropylamine oxide, and a reaction product of a C9-C11 alkanol ethoxylated and 8 moles of ethylene oxide in a weight ratio of about 5 to about 6 to about 2 to about 1, respectively, such as about 4.9 to about 5.8 to about 1.7 to about 1. In at least one implementation, the surfactant system consists of a combination of sodium lauryl ether sulfate (SLES), sodium dodecyl benzene sulfonate (DDBS), betaine, and a reaction product of a C9-C11 alkanol ethoxylated and 8 moles of ethylene oxide in a weight ratio of about 4.2 to about 3.8 to about 1 to about 1.1, respectively.

In at least one implementation, the aqueous cleansing composition may further include a plurality of viscosity modifying agents. The viscosity modifying agents may include ethanol, at least one poloxamer, or a combination thereof. Optionally, the viscosity modifying agents may include a combination of ethanol and at least one poloxamer or other hydrotropes such as sodium xylene sulfonate, sodium cumene sulfonate, and others.

In at least one implementation, the ethanol may be present in an amount of from about 1 wt % to about 3 wt %, about 1.5 wt % to about 2.5 wt %, about 1.75 wt % to about 3 wt %, about 3.5 wt %, or about 2 wt %, based on the total weight of the cleansing composition.

In at least one implementation, the poloxamer may be present in an amount of from about 0.1 wt % to about 0.3 wt %, about 0.15 wt % to about 0.25 wt %, about 0.175 wt % to about 0.225 wt %, or about 0.2 wt %, based on the total weight of the cleansing composition. In at least one implementation, the poloxamer may be present in an amount of from about 0.01 wt % to about 1 wt %, about 0.15 wt % to about 0.25 wt %, about 0.175 wt % to about 0.225 wt %, about 0.25 wt % to about 0.75 wt %, about 0.5 wt %, or about 0.2 wt %, based on the total weight of the cleansing composition.

In at least one implementation, the ethanol and the poloxamer may be present in a weight ratio of from about 7:1 to about 13:1, about 8:1 to about 12:1, about 9:1 to about 11:1, about 4:1 to about 6:1, about 5:1, or about 10:1.

In at least one implementation, the aqueous base may include water.

In at least one implementation, the aqueous cleansing composition may further comprise lactic acid or citric acid as a pH modifying agent. In at least one implementation, the lactic acid or citric acid may be present in an amount of from about 0.1 wt % to about 2%, about 0.2 wt % to about 1.8 wt %, or about 0.25 wt % to about 1.5 wt %. In at least one implementation, the aqueous cleansing composition is free of sulfuric acid.

The foregoing and/or other aspects and utilities embodied in the present disclosure may be achieved by providing a method for preparing the aqueous cleansing compositions disclosed herein. The method may include contacting the aqueous base and the surfactant systems disclosed herein with one another.

Further areas of applicability of the present disclosure will become apparent from the detailed description provided hereinafter. It should be understood that the detailed description and specific examples, while indicating some typical aspects of the disclosure, are intended for purposes of illustration only and are not intended to limit the scope of the disclosure.

DETAILED DESCRIPTION

The following description of various typical aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any embodiments or implementations disclosed herein. Accordingly, the disclosed range should be construed to have specifically disclosed all the possible subranges as well as individual numerical values within that range. As such, any value within the range may be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about"

is used in conjunction therewith. It should also be appreciated that the term "about," as used herein, in conjunction with a numeral refers to a value that may be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

As used herein, "free" or "substantially free" of a material may refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

All references cited herein are hereby incorporated by reference in their entireties. In the event of a conflict in a definition in the present disclosure and that of a cited reference, the present disclosure controls.

It has been surprisingly and unexpectedly discovered that a cleansing composition including a carrier and a surfactant system including a combination of one or more anionic surfactants, one or more amphoteric surfactants, and one or more nonionic surfactants, exhibited relatively lower cloud point as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide (LMDO), and NEODOL®, in a weight ratio of about 3.5 to about 7.5 to about 1.6 to about 1 (3.5:7.5:1.6:1), respectively, or in a weight ratio of about 5 to about 6 to about 6 to about 1 (e.g., 4.9:5.8:1.7:1), respectively, or in a weight ratio of about 4.2 to about 3.8 to about 1 to about 1.1 (e.g., 4.2:3.8:1:1.1), respectively, exhibited relatively lower cloud point as compared to conventional cleansing compositions including the same or similar surfactants in varying weight ratios.

It has also been surprisingly and unexpectedly discovered that a cleansing composition including a carrier and a surfactant system including a combination of one or more anionic surfactants, one or more amphoteric surfactants, and one or more nonionic surfactants, exhibited relatively greater stability as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide, and NEODOL, in a weight ratio of about 3.5 to about 7.5 to about 1.6 to about 1 (3.5:7.5:1.6:1), respectively, or in a weight ratio of about 4.2 to about 3.8 to about 1 to about 1.1 (e.g., 4.2:3.8:1:1.1), respectively, exhibited relatively greater stability as compared to conventional cleansing compositions including the same or similar surfactants in varying weight ratios.

It has also been surprisingly and unexpectedly discovered that a cleansing composition including a carrier and a surfactant system including a combination of one or more anionic surfactants, one or more amphoteric surfactants, and one or more nonionic surfactants exhibited relatively greater stability as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide, and NEODOL®, in a weight ratio of about 3.5 to about 7.5 to about 1.6 to about 1 (3.5:7.5:1.6:1), respectively, exhibited increased flash foam as compared to conventional cleansing compositions including the same or similar surfactants in varying weight ratios. Additionally, it was surprisingly and unexpectedly discovered that a cleansing composition including the carrier and the surfactant system including a combination of SLES, DDBS, lauramidopropyl betaine and/or lauramidopropylamine oxide (LMDO), and NEODOL®, in a weight ratio of about 5 to about 6 to about 6 to about 1 (e.g., 4.9:5.8:1.7:1), respectively, and further comprising lactic acid, exhibited relatively greater stability with less precipitation under cold weather conditions.

It has further been surprisingly and unexpectedly discovered that a cleansing composition including a carrier and a surfactant system including a combination of one or more anionic surfactants, one or more amphoteric surfactants, and one or more nonionic surfactants exhibited increased flash foam as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide, and NEODOL®, in a weight ratio of about 3.5 to about 7.5 to about 1.6 to about 1 (3.5:7.5:1.6:1), respectively, or in a weight ratio of about 5 to about 6 to about 6 to about 1 (e.g., 4.9:5.8:1.7:1), respectively, exhibited increased flash foam as compared to conventional cleansing compositions including the same or similar surfactants in varying weight ratios.

It has also been surprisingly and unexpectedly discovered that a cleansing composition including a carrier and a surfactant system including a combination of one or more anionic surfactants, one or more amphoteric surfactants, and one or more nonionic surfactants exhibited improved oil emulsification as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide, and NEODOL®, in a weight ratio of about 3.5 to about 7.5 to about 1.6 to about 1 (3.5:7.5:1.6:1), respectively, or in a weight ratio of about 5 to about 6 to about 6 to about 1 (e.g., 4.9:5.8:1.7:1), respectively, exhibited improved oil emulsification as compared to conventional cleansing compositions including the same or similar surfactants in varying weight ratios.

It has also been surprisingly and unexpectedly discovered that a cleansing composition including a carrier and a surfactant system present in an amount of about 27 wt % and including a combination of one or more anionic surfactants, one or more amphoteric surfactants, and one or more nonionic surfactants exhibited a relatively lower cloud point as compared to a cleansing compositions including the same surfactant system present in an amount of about 21 wt %. Particularly, it was surprisingly and unexpectedly discovered that a cleansing composition including the carrier and the surfactant system in an amount of about 27 wt % and including a combination of SLES, DDBS, lauramidopropyl betaine and/or lauramidopropylamine oxide, and NEODOL®, in a weight ratio of about 3.5 to about 7.5 to about 1.6 to about 1 (3.5:7.5:1.6:1), respectively, or in a weight ratio of about 5 to about 6 to about 6 to about 1 (e.g., 4.9:5.8:1.7:1), respectively, exhibited a lower cloud point as compared to a cleansing compositions including the same surfactant system present in an amount of about 21 wt %.

It has also been surprisingly and unexpectedly discovered that a cleansing composition including a carrier and a surfactant system including a combination of one or more anionic surfactants, one or more amphoteric surfactants, and one or more nonionic surfactants, exhibited relatively lower contact angle on soiled surfaces as compared to conventional cleansing compositions. Particularly, it was surprisingly and unexpectedly discovered that a cleansing composition including the carrier and the surfactant system including a combination of SLES, DDBS, lauramidopropyl betaine and/or lauramidopropylamine oxide, and NEODOL, in a weight ratio of about 4.2 to about 3.8 to about 1 to about 1.1 (e.g., 4.2:3.8:1:1.1), respectively, exhibited relatively lower contact angle on soiled surfaces as compared to conventional cleansing compositions including the same or similar surfactants in varying weight ratios.

It has further been surprisingly and unexpectedly discovered that a cleansing composition including a combination of viscosity modifying agents provided viscosity with an acceptable range of from about 500 cP to about 1300 cP while maintaining a clear solution before and after cooling. It has also been surprisingly and unexpectedly discovered that the cleansing composition including the combination of viscosity modifying agents exhibited decreased turbidity and improved clarity after mixing. The viscosity modifying agents included a combination of ethanol and a Pluronic® poloxamer present in an amount of about 0.2 wt % and about 2 wt %, respectively, or a weight ratio of about 1:10, in an amount of about 0.5 wt % and 2 wt %, respectively, or a weight ratio of about 1:5.

Compositions disclosed herein may be or include a cleansing product or a cleansing composition thereof. For example, the composition may be a cleansing product including the cleansing composition and/or one or more additional ingredients/components. In another example, the composition may be the cleansing composition of the cleansing product. As used herein, the expression "cleansing product" may refer to a final form that is sold to a consumer. The cleansing product or the cleansing composition thereof may be a liquid, a fluid, a gel, or the like. Illustrative cleansing products and cleansing compositions thereof may be or include, but are not limited to, a home care product, a hand dishwashing product, such as a liquid or gel hand dishwashing product, a light-duty liquid (LDL) product for cleaning kitchen or other surfaces, a home care cleansing composition, a hand dishwashing cleansing composition, such as a liquid or gel hand dishwashing cleansing composition, a light-duty liquid (LDL) cleansing composition for cleaning kitchen or other surfaces, or the like.

As used herein, a "cleansing composition" may refer to any composition that may be used for cleaning a substrate or a surface thereof. A "surface" may refer to hard surfaces, including, but not limited to, kitchen surfaces, such as counter tops, stove tops, dishes, sinks, and cabinets, walls, appliances (e.g., kitchen appliances, bathroom appliances, etc.), fixtures (e.g., sinks, toilets, bathtubs, tiles, doors, etc.), or any other hard surfaces commonly found in the household. The surface may be or include, but is not limited to, the surface of wood, ceramic, plastic, glass, floors, dishes, furniture, textiles or fabrics (e.g., clothes, carpets or rugs, cloths, bedding, leather, etc.), sponges, mops, or the like, or a combination thereof. The surface may also include polymeric surfaces, fibrous surfaces, surfaces of objects fabricated from natural or synthetic materials (e.g., protective gear, sports equipment, etc.). Accordingly, the present cleansing composition may form a portion or a basis of, be incorporated into, and/or be used as a hard surface cleaner, a spray cleaner, a floor cleaner, a microwave cleaner, a stovetop cleaner, an oven cleaner, or the like, or a combination thereof. As used herein, the term "dishes" refers to dishes as well as other tools and utensils involved in the preparation and/or consumption of food.

The cleansing products or the cleansing compositions disclosed herein may be an aqueous cleansing product or an aqueous cleansing composition. The aqueous cleansing product or the aqueous cleansing composition include an aqueous base or carrier, a surfactant system including one or more surfactants, one or more viscosity modifying agents, one or more excipients, or a combination thereof. The aqueous cleansing product or the aqueous cleansing composition thereof may be formulated to be visibly clear and homogenous after exposure to aging or cooling conditions (e.g., about 5° C.). For example, the aqueous cleansing product or the aqueous cleansing composition thereof may include a plurality of surfactants and/or viscosity modifying agents in relative formulated amounts to provide a visibly clear and homogenous composition after exposure to aging or cooling conditions.

The aqueous cleansing composition may be formulated to provide a pourable viscosity in an undiluted and/or diluted form. For example, the aqueous cleansing composition may have a viscosity measured at about 25° C. of from about 500 cP to about 2,000 cP. For example, the aqueous cleansing composition may have a viscosity measured at about 25° C. of from about 500 cP, about 600 cP, about 700 cP, about 750 cP, about 800 cP, about 850 cP, or about 900 cP to about 950 cP, about 1,000 cP, about 1,100 cP, about 1,200 cP, about 1,300 cP, about 1,600 cP, about 1,800 cP, or about 2,000 cP. In another example, the aqueous cleansing composition may have a viscosity measured at about 25° C. of from about 500 cP to about 2,000 cP, about 500 cP to about 1,200 cP, or about 500 cP to about 950 cP.

The surfactant system may be capable of or configured to facilitate the removal of soil, dirt, oil, debris, or the like, from surfaces. The surfactant system may include a plurality of surfactants, including one or more anionic surfactants, one or more amphoteric surfactants, one or more nonionic surfactants, or a combination thereof. The surfactant system may represent the amount or concentration of active ingredients (AI) in the cleansing composition. The surfactant system may be present in an amount of from about 18 wt % to about 29 wt %, about 20 wt % to 29 wt %, about 22 wt % to 29 wt %, about 24 wt % to 29 wt %, about 26 wt % to 28 wt %, about 27 wt %, or about 27.2 wt %, based on the total weight of the aqueous cleansing composition. Accordingly, the aqueous cleansing composition may include active ingredients in an amount of from about 18 wt % to about 29 wt %, about 20 wt % to 29 wt %, about 22 wt % to 29 wt %, about 24 wt % to 29 wt %, about 26 wt % to 28 wt %, about 27 wt %, or about 27.2 wt %, based on the total weight of the aqueous cleansing composition. The surfactant system may also be capable of or configured to provide: a relatively lower cloud point, improved stability, increased flash foam, improved oil emulsification, improved contact angle on soiled surfaces, or a combination thereof. For example, each of the plurality of surfactants in the surfactant system may be varied or modified (e.g., increased or decreased) with respect to weight ratios and/or concentration to provide: a relatively lower cloud point, improved stability, increased flash foam, improved oil emulsification, improved contact angle on soiled surfaces, or a combination thereof.

The one or more one anionic surfactants may be or include, but are not limited to, an alkyl sulfonate, an alkyl ethoxy sulfate, or a salt thereof, or a combination thereof. The alkyl sulfonate may be or include a branched or linear alkyl benzene sulfonate, optionally, magnesium linear alkyl benzene sulfonate, sodium linear alkyl benzene sulfonate, or triethanolamine linear alkyl benzene sulfonate. In an exemplary implementation, the linear alkyl benzene sulfonate includes dodecyl benzene sulfonate, such as sodium dodecyl benzene sulfonate. The alkyl ethoxy sulfate may also be or include a fatty acid ethoxylate sulfate, optionally C12-C15 alkyl ethoxysulfate with 1-3 ethoxylate (EO) groups per molecule, or a salt thereof. In an exemplary implementation, the fatty acid ethoxylate sulfate may be or include ammonium laureth sulfate, sodium lauryl ether sulfate (SLES), also referred to as sodium laureth sulfate, or a combination thereof. The sodium lauryl ether sulfate may have an average of about 1 to about 10 moles of ethylene oxide per mole, or about 1 to 3 moles of ethylene oxide per mole, or about 2 to about 3 moles of ethylene oxide per mole. Illustrative anionic surfactants may be or include, but are not limited to, sodium lauryl sulfate, sodium laureth sulfate, sodium cocoyl monoglyceride sulfonate, sodium lauryl sarcosinate, sodium lauryl isocthionate, sodium laureth carboxylate, sodium dodecyl benzenesulfonate (DDBS), or a combination thereof. In an exemplary implementation, the one or more anionic surfactants include at least sodium lauryl ether sulfate (SLES) and sodium dodecyl benzenesulfonate (DDBS).

The one or more anionic surfactants may be present in an amount of from about 16 wt % to about 26 wt %, about 18 wt % to about 26 wt %, about 20 wt % to about 24 wt %, about 21 wt % to about 22 wt %, about 16 wt %, about 22 wt %, or about 23%, based on the total weight of the aqueous cleansing composition. In an exemplary implementation, the one or more anionic surfactants include at least sodium lauryl ether sulfate (SLES) and sodium dodecyl benzenesulfonate (DDBS). The combination of SLES and DDBS may be present in an amount of from about 16 wt % to about 26 wt %, about 18 wt % to about 26 wt %, about 20 wt % to about 24 wt %, about 21 wt % to about 22 wt %, or about 22 wt %, based on the total weight of the aqueous cleansing composition. The SLES may be present in an amount of from about 4 wt % to about 10 wt %, about 5 wt % to about 9 wt %, about 6 wt % to about 8 wt %, about 7 wt %, about 8 wt %, or about 8.5 wt %, based on the total weight of the aqueous cleansing composition. The DDBS may be present in an amount of from about 6 wt % to about 18 wt %, about 7 wt % to about 18 wt %, about 12 wt % to about 18 wt %, about 13 wt % to about 17 wt %, about 14 wt % to about 16 wt %, about 7 wt %, about 7.5 wt %, or about 15 wt %, based on the total weight of the aqueous cleansing composition. The weight ratio of the SLES to the DDBS may be from about 1:1 to about 1:3, about 1:1.5 to about 1:2.5, or about 1:2.

In certain embodiments, the SLES may be present in an amount of from about 6 wt % to about 12 wt %, about 7 wt % to about 10 wt %, about 9 wt % to about 10 wt %, or about 10 wt %, based on the total weight of the aqueous cleansing composition. In certain embodiments, the DDBS may be present in an amount of from about 7 wt % to about 18 wt %, about 10 wt % to about 16 wt %, about 11 wt % to about 15 wt %, about 11 wt % to about 12 wt %, or about 12 wt %, based on the total weight of the aqueous cleansing composition. The weight ratio of the SLES to the DDBS may be from about 1.3:1 to about 1:3, about 1.1:1 to about 1.5:1, about 1:1 to about 1:2, about 1:1.1 to about 1:1.3, or about 1:1.2.

The one or more amphoteric surfactants may include at least one quaternary ammonium group or cation and at least one carboxylate. For example, the one or more amphoteric surfactants may be or include, but is not limited to, a betaine-based surfactant, an amine oxide surfactant, or a combination thereof. Illustrative betaine-based surfactants may be or include, but are not limited to, imidazoline-based betaines, alkyl dimethyl aminoacetic acid betaines, fatty acid amide propyl betaines, sulfobetaines, lauryl amidopropyl amino oxide (LMDO), or the like, or a combination thereof. In an exemplary implementation, the betaine-based surfactant may be or include, but is not limited to, one or more fatty acid amide propyl betaines, fatty acid amidopropyl betaines, or a combination thereof. Illustrative betaine-based surfactants may be or include, but are not limited to, cocodimethylcarboxymethyl betaine, cocamidopropyl betaine, lauryldimethylcarboxymethyl betaine, lauryldimethylcarboxyethyl betaine, cetyldimethylcarboxymethyl betaine, lauryl-bis-(2-hydroxyethyl)carboxymethyl betaine, oleyldimethylgammacarboxypropyl betaine, lauryl-bis-(2-hydroxypropyl)-carboxyethyl betaine, lauramidopropyl betaine, or the like, or combinations thereof. In an exemplary implementation, the amphoteric surfactants include the betaine-based surfactant and/or the amino oxide surfactant, wherein the betaine based surfactant may be lauramidopropyl betaine, and the amino oxide surfactant may be lauryl amido propyl amine oxide. It should be appreciated that lauramidopropyl betaine and lauramidopropylamine oxide (LMDO) may be considered as equivalent materials that may be utilized interchangeably without materially affecting the compositions. As such, references made herein to lauramidopropyl betaine also encompass LMDO; similarly, references made to LMDO encompass lauramidopropyl betaine.

The one or more amphoteric surfactants may be present in an amount of from greater than 0 wt % to about 6 wt %, about 1 wt % to about 5 wt %, about 2 wt % to about 4 wt %, or about 3 wt %, based on the total weight of the aqueous cleansing composition. In an exemplary implementation, the one or more amphoteric surfactants include at least lauramidopropyl betaine and/or lauramidopropylamine oxide. The lauramidopropyl betaine and/or lauramidopropylamine oxide may be present in an amount of from greater than 0 wt % to about 6 wt %, about 1 wt % to about 5 wt %, about 2 wt % to about 4 wt %, about 3 wt % to about 4 wt %, about 3.5 wt %, or about 3 wt %, based on the total weight of the aqueous cleansing composition.

The total weight ratio of the anionic surfactants to the amphoteric surfactants may be from about 4:1 to about 10:1, about 5:1 to about 9:1, about 6:1 to about 8:1, or about 7:1. The weight ratio of the SLES to LMDO may be from about 1:1 to about 3:1, about 2:1 to about 2.5:1, or about 2.2:1. The weight ratio of the DDBS to cocoamidopropyl betaine may be from about 2:1 to about 7:1, about 3:1 to about 6:1, about 4:1 to about 6:1, about 4.5:1 to about 5:1, or about 4.75:1.

The nonionic surfactants may be or include, but are not limited to, the condensation products of a higher alcohol (e.g., an alkanol containing about 8 to 18 carbon atoms in a straight or branched chain configuration) condensed with about 5 to 30 moles of ethylene oxide, for example, lauryl or myristyl alcohol condensed with about 16 moles of ethylene oxide (EO), tridecanol condensed with about 6 to moles of EO, myristyl alcohol condensed with about 10 moles of EO per mole of myristyl alcohol, the condensation product of EO with a cut of coconut fatty alcohol containing a mixture of fatty alcohols with alkyl chains varying from 10 to about 14 carbon atoms in length and wherein the condensate contains either about 6 moles of EO per mole of total alcohol or about 9 moles of EO per mole of alcohol and tallow alcohol ethoxylates containing 6 EO to 11 EO per mole of alcohol.

The one or more nonionic surfactants may also be or include, but are not limited to, a higher aliphatic, C9-C15 primary alcohol or alkanol. For example, the nonionic surfactants may be a reaction product (e.g., a condensation product) of C9-C15 or C9-C11 alkanol and 2.5 to 10 moles of ethylene oxide, C12-C13 alkanol and 6.5 moles of ethylene oxide, C12-C15 alkanol and 12 moles of ethylene oxide, C14-C15 alkanol with 13 moles ethylene oxide, or the like. For example, the nonionic surfactants may be or include, but are not limited to, NEODOL® 91-2.5, 91-5, 91-6, 91-8, or 91-8.4, NEODOL® 23-6.5, NEODOL® 25-12, NEODOL® 45-13, NEODOL® 135, NEODOL® 67, or the like, or a combination thereof, all of which are commercially available from Shell Corp. of Houston, TX. NEODOL® is a tradename of Shell Corp. of Houston, TX for its alcohol ethoxylate surfactants. Other exemplary nonionic surfactants may include Sasol's Marlipal or Alfonic 10-8 Ethoxylate. Other suitable nonionic surfactants are described in International Publication WO 2007/001593 to The Clorox Company, and U.S. Pat. No. 6,342,473 to Kott et al., the disclosures of which are incorporated herein by reference. In an exemplary implementation, the one or more nonionic surfactants includes at least one NEODOL® surfactant or at least one higher aliphatic, primary alcohol. In a particular implementation, the one or more nonionic surfactants include NEODOL® 91-8 (CAS No. 68439-46-3), a high purity C9-C11 alcohol ethoxylated with 8 moles of ethylene oxide per mole of alcohol (C9-11 Alcohol Ethoxylate, 8 EO).

The nonionic surfactants may be present in an amount of from greater than 0 wt % to about 4 wt %, about 0.5 wt % to about 3.5 wt %, about 1 wt % to about 3 wt %, about 1.5 wt % to about 2.5 wt %, about 2 wt %, or about 2.3 wt %, based on the total weight of the aqueous cleansing composition. In an exemplary implementation, the nonionic surfactants include NEODOL® 91-8 (CAS No. 68439-46-3) a high purity C9-C11 alcohol ethoxylated with 8 moles of ethylene oxide per mole of alcohol (C9-11 Alcohol Ethoxylate, 8 EO) in an amount of from greater than 0 wt % to about 4 wt %, about 0.5 wt % to about 3.5 wt %, about 1 wt % to about 3 wt %, about 1.5 wt % to about 2.5 wt %, about 2 wt %, or about 2.3 wt %, based on the total weight of the aqueous cleansing composition.

The total weight ratio of the anionic surfactants to the nonionic surfactants may be from about 6:1 to about 12:1, about 7:1 to about 10:1, about 8:1 to about 14:1, about 9:1 to about 13:1, about 10:1 to about 12:1, or about 11:1. The weight ratio of SLES to NEODOL® may be from about 2:1 to about 5:1, about 2.5:1 to about 4.5:1, about 3:1 to about 4:1, about 3.7:1, or about 3.5:1. The weight ratio of the DDBS to NEODOL® may be from about 2:1 to 11:1, about 2:1 to about 10:1, about 6:1 to about 9:1, or about 7:1 to about 8:1, about 3.3:1, or about 7.5:1. The weight ratio of LMDO to NEODOL® may be from about 0.5:1 to about 2.5:1, about 0.8:1 to about 2:1, or about 1.6:1.

In at least one implementation, the surfactant system includes one or more of SLES, DDBS, LMDO, NEODOL® (e.g., NEODOL® 91-8), or a combination thereof. For example, the surfactant system includes a combination of SLES, DDBS, LMDO, and NEODOL®. The combination of SLES, DDBS, LMDO, and NEODOL® may be present in a weight ratio of about 3.5 to about 7.5 to about 1.6 to about 1 (3.5:7.5:1.6:1), respectively. In another example, the combination of SLES, DDBS, LMDO, and NEODOL® may be present in a weight ratio of about 4.2 to about 3.8 to about 1 to about 1.1 (4.2:3.8:1:1.1), respectively. The combination of SLES, DDBS, LMDO, and NEODOL® may be present in an amount of from about 18 wt % to about 2 wt %, about 20 wt % to 28 wt %, about 22 wt % to 28 wt %, about 24 wt % to 28 wt %, about 26 wt % to 28 wt %, about 27 wt %, or about 27.2 wt %, based on the total weight of the aqueous cleansing composition.

The aqueous base or carrier may be capable of or configured to store, entrain, or otherwise contain the surfactant system. The carrier may be or include, but is not limited to, any one or more of solvents, fragrances, enzymes, polymers, water, emulsifying agents, thickeners, colorants, natural actives or extracts, antimicrobial agents, pH modifying agents (e.g., acids, bases, and/or buffers), dyes, preservatives, chelating agents, viscosity modifying agents, salts, or the like, or any mixture or combination thereof, in addition to any one or more of the other carrier components disclosed herein.

The solvents may include any water soluble solvents, such as those that may be capable of or configured to act as a hydrotrope. Water soluble solvents include, but are not limited to, C2-4 mono, dihydroxy, or polyhydroxy alkanols and/or an ether or diether, such as ethanol, isopropanol, diethylene glycol monobutyl ether, dipropylene glycol methyl ether, diproyleneglycol monobutyl ether, propylene glycol n-butyl ether, propylene glycol, hexylene glycol, propanediol, and alkali metal cumene, alkali metal toluene, or alkali metal xylene sulfonates, such as sodium cumene sulfonate and sodium xylene sulfonate (SXS). In an exemplary implementation, the solvents include may include ethanol and diethylene glycol monobutyl ether, both of which are miscible with water. Urea can be optionally used at a concentration of 0.1% to 7 weight %. Solvents such as ethanol (typically used at 5 to 12 wt %), SXS (typically used at 0.25 to 1 wt %) and propylene glycol (typically used at 0.5 to 5 wt %) act to lower the viscosity of the composition.

Water of the aqueous cleansing composition or the carrier thereof may be deionized water, demineralized water, and/or softened water. Water may make up the balance of the cleansing composition. For example, the amount of water in the cleansing composition may be from about 10 wt % to 90 wt %, about 40 wt % to about 85 wt %, or about 60 wt % to about 80 wt %. In another example, the amount of water in the cleansing composition may be at least 60 wt %, at least 65 wt %, at least 70 wt %, at least 72 wt %, at least 74 wt %, at least 76 wt %, at least 78 wt %, or at least 79 wt %. The amount of water in the cleansing composition may include free water added and water introduced with other components or materials of the cleansing composition. For example, the amount of the water in the cleansing composition may include free water and water associated with the surfactants or any other component of the cleansing composition.

The one or more viscosity modifying agents may be capable of or configured to modify (e.g., increase or decrease) a viscosity of the aqueous cleansing composition. In at least one implementation, the viscosity modifying agent may be or include a polymer, such as a poloxamer. The poloxamer may be a liquid or a paste. The poloxamer may be or include a block copolymer. For example, the poloxamer may be or include a poly(ethylene glycol)-poly(propylene glycol)-poly(ethylene glycol) block copolymer (PEG-PPG-PEG), such as, poly(ethylene glycol)-block-poly (propylene glycol)-block-poly(ethylene glycol). The poloxamer may have an average molecular weight of less than or equal to about 12,000 Dalton (Da), less than or equal to about 11,000 Da, less than or equal to about 10,000 Da, less than or equal to about 9,000 Da, less than or equal to about 8,000 Da, less than or equal to about 7,000 Da, or less than or equal to about 6,000 Da. Illustrative poloxamers may be or include, but are not limited to, one or more of PLURONIC® L35, PLURONIC® L43, PLURONIC® L64, PLURONIC® L10, PLURONIC® L44 (CAS No. 9003-11-6), PLURONIC® L62, PLURONIC® 10R5, PLURONIC® 17R4, PLURONIC® L25R4, PLURONIC® P84, PLURONIC® P65, PLURONIC® P104, and PLURONIC® P105, or the like, or any mixture or combination thereof, each of which or commercially available from BASF Corp. of Florham Park, NJ. In a preferred implementation, the polymer includes poloxamer 124 or PLURONIC® L44 (CAS No. 9003-11-6).

In at least one implementation, one or more of the solvents may act as a viscosity modifying agent. For example, ethanol may be included in the aqueous cleansing composition as a solvent and a viscosity modifying agent. In an exemplary implementation, the viscosity modifying agents include a combination of ethanol and one or more poloxamers.

In at least one implementation, each of the viscosity modifying agents may be present in an amount effective to provide a viscosity of from about 500 cP to about 1300 cP measured at about 25° C. Each of the viscosity modifying agents may also be present in an amount effective to provide a cloud point less than 5° C., less than 4° C., less than 3° C., less than 2° C., less than 1° C., or less than 0° C. Each of the viscosity modifying may also be present in an amount effective to improve stability of the cleansing composition, reduce turbidity of the cleansing composition, maintain clarity of the cleansing composition, recover clarity of the cleansing composition after exposure to cooling conditions, or a combination thereof. In an exemplary implementation, the viscosity modifying include a combination of ethanol and one or more poloxamers. The amount and/or weight ratio of the ethanol and the poloxamer may be modified to modify the viscosity of the cleansing composition, improve stability of the cleansing composition, reduce turbidity of the cleansing composition, maintain clarity of the cleansing composition, recover clarity of the cleansing composition after exposure to cooling conditions, or a combination thereof. The ethanol may be present in an amount of from about 1 wt % to about 3 wt %, about 1.5 wt % to about 2.5 wt %, about 1.75 wt % to about 2.75 wt %, about 2.5 wt %, or about 2 wt %, based on the total weight of the cleansing composition. The poloxamer may be present in an amount of from about 0.01 wt % to about 1 wt %, about 0.15 wt % to about 0.25 wt %, about 0.175 wt % to about 0.25 wt %, about 0.25 wt % to about 0.75 wt %, about 0.5 wt %, or about 0.2 wt %, based on the total weight of the cleansing composition. The weight ratio of ethanol to the poloxamer in the viscosity modifying agents may be from about 4:1 to about 13:1, about 7:1 to about 13:1, about 8:1 to about 12:1, about 9:1 to about 11:1, about 4:1 to about 6:1, about 5:1, or about 10:1.

It should be appreciated by one having ordinary skill in the art that the cleansing products and/or the cleansing compositions thereof disclosed herein may include other additional ingredients/components. For example, the cleansing composition may include any one or more additional ingredients to provided added effects or to make the product more attractive to a consumer. Illustrative additional ingredients may be or include, but are not limited to, perfumes, fragrances, abrasive agents, disinfectants, radical scavengers, bleaches, acids, chelating agents, antibacterial agents/preservatives, pH modifying agents, optical brighteners, or a combination thereof.

In at least one implementation, the cleaning composition may include one or more acids, one or more bases, and/or one or more buffers or buffering agents configured to adjust or control the pH of the cleansing product and/or cleansing composition. The one or more acids, one or more bases, and/or one or more buffers may, separately and independently, be present in an amount of from greater than 0 wt % to less than or equal to about 10 wt %, less than or equal to about 8 wt %, less than or equal to about 6 wt %, less than or equal to about 4 wt %, less than or equal to about 2 wt %, less than or equal to about 1 wt %, less than or equal to about 0.6 wt %, less than or equal to about 0.5 weight %, or less than or equal to about 0.4 wt %, based on a total weight of the cleaning composition, such as in an amount of from about 0.1 wt % to about 0.5 wt %, about 0.2 wt % to about 0.3 wt %, or about 0.25 wt %. In certain embodiments, the one or more acids, one or more bases, and/or one or more buffers may, separately and independently, be present in an amount of about 0.5 wt % to about 2.5 wt %, such as about 1 wt % to about 2 wt %, or about 0.4 wt % to about 1.6 wt %.

Illustrative bases may include, but are not limited to, ammonia; mono-, di-, and tri-alkyl amines; mono-, di-, and tri-alkanolamines; alkali metal and alkaline earth metal hydroxides; sodium hydroxide, potassium hydroxide, lithium hydroxide, monoethanolamine, triethylamine, isopropanolamine, diethanolamine, triethanolamine, or the like, or combinations thereof. Illustrative acids may include, but are not limited to, mineral acids, such as hydrochloric acid, nitric acid, phosphoric acid, and sulfuric acid, polycarboxylic and/or organic acids, such as citric acid, acetic acid, lactic acid, glycolic acid, formic acid, butyric acid, propionic acid, valeric acid, malic acid, oxalic acid, carbonic acid, taurine, or the like, or combinations thereof. In certain embodiments, the cleansing product and/or cleansing composition is free of sulfuric acid. In certain embodiments, the cleansing product and/or cleansing composition comprises lactic acid as a pH modifying agent, such as about 0.2 wt % to about 3 wt %, about 1.4 wt %, or about 0.25 wt % lactic acid. Lactic acid, having a greater solubility than other acids, e.g., sulfuric acid, may be used in the cleansing product and/or cleansing compositions disclosed herein, as it may aid in the prevention of precipitation products resulting from salt formation, e.g., precipitation of sulfates from the cleansing product and/or cleansing composition as a result of sulfuric acid addition.

The preservatives may be present in an amount of from greater than 0 wt % to 3 wt % or about 0.01 wt % to about 2.5 wt %. Illustrative preservatives may be or include, but are not limited to, benzalkonium chloride; benzethonium chloride, 5-bromo-5-nitro-1,3dioxane; 2-bromo-2-nitropropane-1,3-diol; alkyl trimethyl ammonium bromide; N-(hydroxymethyl)-N-(1,3-dihydroxy methyl-2,5-dioxo-4-imidaxolidinyl-N'-(hydroxy methyl)urea; 1-3-dimethyol-5,5-dimethyl hydantoin; formaldehyde; iodopropynl butyl carbamate, butyl paraben; ethyl paraben; methyl paraben; propyl paraben, mixture of methyl isothiazolinone/methylchloroisothiazoline in a 1:3 wt. ratio; mixture of phenoxythanol/butyl paraben/methyl paraben/propylparaben; 2-phenoxyethanol; tris-hydroxyethyl-hexahydrotriaz-ine; methylisothiazolinone; 5-chloro-2-methyl-4-isothiazolin-3-one; 1,2-dibromo-2,4-dicyanobutane; 1-(3-chloroalkyl)-3,5,7-triaza-azoniaadam-antane chloride; sodium benzoate, benzylisothiazolinone, organic acids, such as lactic acid, or a combination thereof.

The chelating agents may be or include, but are not limited to, glutamic acid, N,N-diacetic acid, tetra sodium salt, e.g., Dissolvine® GL-47-S(CAS Number 51981-21-6), diethylenetriamine pentaacetate (DTPA), ethylenediamine tetraacetic acid (EDTA), etidronic acid, iminodisuccinate, or the like, or a combination thereof.

The present disclosure may provide methods for preparing aqueous cleansing products or aqueous cleansing compositions disclosed herein. The method may include combining, mixing, or otherwise contacting the aqueous base or carrier, the surfactant system, the one or more viscosity modifying agents, one or more excipients, or a combination thereof disclosed herein, with one another.

The present disclosure may also provide methods for improving a cloud point of a cleansing product or a cleansing composition, improving a stability of a cleansing product or a cleansing composition, improving flash foam of a cleansing product or a cleansing composition, improving cleaning ability of a cleansing product or a cleansing composition, such, for example, by decreasing the contact angle of the cleansing product or cleansing composition, improving oil emulsification of a cleansing product or a cleansing composition, or a combination thereof. The method may include combining, mixing, or otherwise contacting the aqueous base or carrier, the surfactant system, the one or more viscosity modifying agents, one or more excipients, or a combination thereof disclosed herein, with one another.

The present disclosure may also provide a method for preparing a cleansing composition having a viscosity of from about 500 cP to about 1300 cP while maintaining a clear solution before and after cooling. The method may include combining a plurality of viscosity modifying agents including ethanol and a poloxamer with one another. The ethanol and poloxamer may be combined with one another in an amount of about 2 wt % and about 0.2 wt %, respectively, or a weight ratio of about 10:1, or, in certain embodiments, in an amount of about 2.5 wt % to about 0.5 wt %, respectively, or a weight ratio of about 5:1.

The following numbered paragraphs disclose one or more exemplary variations of the subject matter of the application:

1. An aqueous cleansing composition, comprising: an aqueous base; and a surfactant system comprising a plurality of surfactants dispersed in the aqueous base, the plurality of surfactants comprising one or more anionic surfactants, one or more amphoteric surfactants, one or more nonionic surfactants, or a combination thereof, wherein the aqueous cleansing composition comprises a viscosity measured at about 25° C. of from about 500 cp to about 1300 cp, such as from about 500 cP to about 950 cP.
2. The aqueous cleansing composition of paragraph 1, wherein the surfactant system is present in an amount of from about 18 wt % to about 29 wt %, 20 wt % to 29 wt %, about 22 wt % to 29 wt %, about 24 wt % to 29 wt %, about 26 wt % to 28 wt %, about 27 wt %, or about 27.2 wt %, based on the total weight of the aqueous cleansing composition.
3. The aqueous cleansing composition of paragraph 1 or 2, wherein the surfactant system comprises a combination of the one or more anionic surfactants, the one or more amphoteric surfactants, and the one or more nonionic surfactants.
4. The aqueous cleansing composition of any one of paragraphs 1 to 3, wherein the one or more anionic surfactants comprise an alkyl sulfonate, an alkyl ethoxy sulfate, or a salt thereof, or a combination thereof, optionally, the one or more anionic surfactants comprise an alkyl sulfonate and an alkyl ethoxy sulfate or a salt thereof.
5. The aqueous cleansing composition of paragraph 4, wherein the alkyl sulfonate comprises a branched or linear alkyl benzene sulfonate, optionally, a sodium linear alkyl benzene sulfonate, further optionally, sodium dodecyl benzene sulfonate (DDBS).
6. The aqueous cleansing composition of paragraph 4 or 5, wherein the alkyl ethoxy sulfate or a salt thereof comprises a fatty acid ethoxylate sulfate, optionally, C12-C15 alkyl ethoxysulfate with 1-3, such as 1, ethoxylate groups per molecule, or a salt thereof, further optionally, the fatty acid ethoxylate sulfate comprises sodium lauryl ether sulfate (SLES).
7. The aqueous cleansing composition of any one of paragraphs 1 to 6, wherein the one or more anionic surfactants are present in an amount of from about 16 wt % to about 26 wt %, 18 wt % to about 26 wt %, about 20 wt % to about 24 wt %, about 21 wt % to about 22 wt %, or about 22 wt %, based on the total weight of the aqueous cleansing composition.
8. The aqueous cleansing composition of any one of paragraphs 5 to 7, wherein the DDBS is present in an amount of from about 6 wt % to about 18 wt %, about 8 wt % to about 16 wt %, about 11 wt % to about 15 wt %, about 11 wt % to about 12 wt %, about 7.5 wt %, or about 12 wt %, based on the total weight of the aqueous cleansing composition.
9. The aqueous cleansing composition of any one of paragraphs 6 to 8, wherein the SLES is present in an amount of from about 6 wt % to about 12 wt %, about 7 wt % to about 10 wt %, about 9 wt % to about 10 wt %, about 8.5 wt %, or about 10 wt %, based on the total weight of the aqueous cleansing composition.
10. The aqueous cleansing composition of any one of paragraphs 1 to 9, wherein the one or more amphoteric surfactants comprise a betaine-based surfactant, an amine oxide surfactant, or a combination thereof, optionally, the betaine-based surfactant comprises one or more of imidazoline-based betaines, alkyl dimethyl aminoacetic acid betaines, fatty acid amide propyl betaines, sulfobetaines, or a combination thereof, further optionally, the betaine-based surfactant comprises lauramidopropyl betaine, further optionally, the amine oxide surfactant comprises lauramidopropylamine oxide (LMDO), further optionally, the amphoteric surfactants comprise either lauramidopropyl betaine or lauramidopropylamine oxide.
11. The aqueous cleansing composition of any one of paragraphs 1 to 10, wherein the one or more amphoteric surfactants are present in an amount of from greater than 0 wt % to about 6 wt %, about 1 wt % to about 5 wt %, about 2 wt % to about 4 wt %, about 3 wt % to about 4 wt %, about 3.5 wt %, or about 3 wt %, based on the total weight of the aqueous cleansing composition.
12. The aqueous cleansing composition of any one of paragraph 1 to 11, wherein the one or more nonionic surfactants comprise a reaction product of a C9-C15 or a C9-C11 alkanol and 2.5 to 10 moles of ethylene oxide, a reaction product of a C12-C13 alkanol and 6.5 moles of ethylene oxide, a reaction product of a C12-

C15 alkanol and 12 moles of ethylene oxide, or a reaction product of a C14-C15 alkanol with 13 moles ethylene oxide, preferably a reaction product of a C9-C11 alkanol ethoxylated and 8 moles of ethylene oxide, further optionally, the nonionic surfactants comprise NEODOL® 91-8.

13. The aqueous cleansing composition of any one of paragraphs 1 to 12, wherein the one or more nonionic surfactants are present in an amount of from greater than 0 wt % to about 4 wt %, about 0.5 wt % to about 3.5 wt %, about 1 wt % to about 3 wt %, about 1.5 wt % to about 2.5 wt %, about 2.2 wt %, or about 2 wt %, based on the total weight of the aqueous cleansing composition.

14. The aqueous cleansing composition of any of paragraphs 1 to 13, wherein the surfactant system comprises a combination of sodium lauryl ether sulfate (SLES), sodium dodecyl benzene sulfonate (DDBS), lauramidopropyl betaine or lauramidopropylamine oxide, and a reaction product of a C9-C11 alkanol ethoxylated and 8 moles of ethylene oxide in a weight ratio of about 3.5 to about 7.5 to about 1.6 to about 1, respectively, or in a weight ratio to about 5 to about 6 to about 2 to about 1, respectively, or in a weight ratio of about 4.2 to about 3.8 to about 1 to about 1.1, respectively.

15. The aqueous cleansing composition of any of paragraphs 1 to 14, further comprising a plurality of viscosity modifying agents, the viscosity modifying agents comprising ethanol, a poloxamer, or a combination thereof, optionally, the viscosity modifying agents comprise a combination of ethanol and poloxamer.

16. The aqueous cleansing composition of paragraph 15, wherein the ethanol is present in an amount of from about 1 wt % to about 3 wt %, about 1.5 wt % to about 2.5 wt %, about 1.75 wt % to about 3 wt %, about 2.5 wt %, or about 2 wt %, based on the total weight of the cleansing composition.

17. The aqueous cleansing composition of paragraph 15 or 16, wherein the poloxamer is present in an amount of from about 0.01 wt % to about 1 wt %, about 0.15 wt % to about 0.25 wt %, about 0.175 wt % to about 0.25 wt %, about 0.25 wt % to about 0.75 wt %, about 0.5 wt %, or about 0.2 wt %, based on the total weight of the cleansing composition.

18. The aqueous cleansing composition of any one of paragraphs 15 to 17, wherein the ethanol and the poloxamer are present in a weight ratio of from about 7:1 to about 13:1, about 8:1 to about 12:1, about 9:1 to about 11:1, about 4:1 to about 6:1, about 5:1, or about 10:1.

19. The aqueous cleansing composition of any one of paragraphs 1 to 18, wherein the aqueous base comprises water.

20. The aqueous cleansing composition of any one of paragraphs 1 to 19, wherein the aqueous cleansing composition further comprises lactic acid or citric acid as a pH adjuster, optionally wherein the lactic acid or citric acid is present in an amount of from about 0.1 wt % to about 2.5%, about 1 wt % to about 2 wt %, about 1.4 wt % to about 1.6 wt %, about 0.2 wt % to about 0.3 wt %, or about 0.25 wt %.

21. The aqueous cleansing composition of any one of paragraphs 1 to 19, wherein the aqueous cleansing composition is free of sulfuric acid.

22. A method for preparing the aqueous cleansing composition of any one of paragraphs 1 to 21, the method comprising contacting the aqueous base and the surfactant system with one another.

EXAMPLES

The examples and other implementations described herein are exemplary and not intended to be limiting in describing the full scope of compositions and methods of this disclosure. Equivalent changes, modifications and variations of specific implementations, materials, compositions and methods may be made within the scope of the present disclosure, with substantially similar results.

Example 1

Four cleansing compositions (1)-(4) were prepared by combining the ingredients/components according to Table 1.

TABLE 1

Cleansing Compositions (1)-(4)

| Ingredient/Component | (1) (wt %) | (2) (wt %) | (3) (wt %) | (4) (wt %) |
|---|---|---|---|---|
| Softened Water | 57.27 | 44.23 | 45.72 | 55.4 |
| SLES | 10.45 | 6.98 | 13.38 | 5.46 |
| DDBS | 5.94 | 15.04 | 7.60 | 11.75 |
| LMDO/Lauramidopropyl betaine | 4.10 | 3.17 | 5.25 | 2.48 |
| NEODOL ® | 0.75 | 2.0 | 0.96 | 1.56 |
| Excipients | Balance | Balance | Balance | Balance |
| Total Components (wt %) | 100 | 100 | 100 | 100 |
| Total Active Ingredients (wt %) | 21.25 | 27.19 | 27.19 | 21.25 |

As indicated in Table 1, each of the cleansing compositions (1)-(4) has a surfactant system including a combination of SLES, DDBS, LMDO or lauramidopropyl betaine, and NEODOL®. It should be appreciated that the cleansing compositions (2) and (3) have the same amount of active ingredients (AI), but with varying amounts and/or ratios of each of the surfactants. It should also be appreciated that cleansing composition (4) has the same ratio of each of the surfactants as cleansing composition (2), but was diluted from about 27.2 wt % to about 21.25 wt %. It should also be appreciated that cleansing composition (1) has the same amount of active ingredients as cleansing composition (4), but with varying amounts and/or ratios of each of the surfactants. As further indicated, cleansing composition (3) has the same ratio as cleansing composition (1), but with a higher amount of active ingredients.

Example 2

Each of the cleansing compositions (1)-(4) of Example 1 was evaluated for their respective stability when exposed to aging conditions. Particularly, each of the cleansing composition (1)-(4) was evaluated to determine the respective cloud point when exposed to relatively low temperatures. It should be appreciated that a stable formulation for the cleansing composition is represented by a cloud point that is less than or equal to about 5° C. To determine the cloud point of each of the cleansing compositions (1)-(4), a predetermined amount of the respective cleansing composition was disposed into a test tube with a thermometer. The test tube was then placed in a beaker filled with water and ice and visually observed for cloudiness as the temperature of the respective cleansing composition decreases. The results are summarized in Table 2.

TABLE 2

| Cloud Point of Cleansing Compositions (1)-(4) | |
|---|---|
| Cleansing Composition | Cloud Point (° C.) |
| (1) | −10.8 |
| (2) | −4.9 |
| (3) | 10 |
| (4) | 7 |

As discussed above, cleansing composition (1) and (3) shared the same ratio of surfactants, but with a different amount of total active ingredients (AI). Further, cleansing compositions (2) and (4) shared the same ratio of surfactants, but with a different amount of total AI. As such, Table 2 illustrates that the surfactant system having the surfactant ratios of cleansing compositions (2) and (4) exhibited relatively more stable formulations as compared to the surfactant system having the surfactant ratios of cleansing compositions (1) and (3). It was also surprisingly and unexpectedly discovered that cleansing composition (2), which included about 27.2 wt % of active ingredients, exhibited a relatively lower cloud point and relatively greater stability as compared to cleansing composition (4), which included the same ratio of respective surfactants and a total active ingredient concentration of about 21.25 wt %.

Example 3

Each of the cleansing compositions (1)-(4) of Example 1 was evaluated for their respective efficacy for emulsifying oil or oil emulsification. To evaluate the oil emulsification, the turbidity (quantified in Nephelometric Turbidity Units, NTUs) was measured with varying amounts of added oleic acid. It should be appreciated that turbidity is an index of clarity or opacity measured by the degree of light scattering by all suspended materials. The turbidity of an emulsion is a function of particle size and concentration of the micelles; and thus, changes in turbidity indicate the change in particle size and concentration of micelles and emulsification capacity. Accordingly, it should be appreciated that cleansing compositions having relatively improved emulsifiers or increased efficacy for oil emulsification will exhibit lower turbidity compared to cleansing compositions having decreased efficacy for oil emulsification.

To evaluate the oil emulsification, oleic acid was added to each of the cleansing compositions (1)-(4) in 200 μL increments under constant agitation until a maximum turbidity (e.g., about 1,000 NTUs or greater) was observed. The turbidity was evaluated with a portable turbidimeter (Model 2100Q from HACH Company of Loveland, Colorado). The results are summarized in Tables 3a and 3B.

TABLE 3a

| Turbidity of Cleansing Compositions (1)-(4) | | | | |
|---|---|---|---|---|
| | Turbidity (NTU) | | | |
| Cleansing Composition | 0 μL Oleic Acid | 200 μL Oleic Acid | 400 μL Oleic Acid | 600 μL Oleic Acid |
| (1) | 0.68 ± 0.02 | 63.93 ± 3.16 | 131.67 ± 15.50 | 145.33 ± 26.63 |
| (2) | 0.85 ± 0.10 | 28.03 ± 4.75 | 130.33 ± 22.74 | 228.339 ± 3.62 |
| (3) | 0.73 ± 0.10 | 166.67 ± 23.59 | 520.67 ± 26.58 | 689.67 ± 21.78 |
| (4) | 0.61 ± 0.03 | 105.33 ± 8.39 | 343.00 ± 47.70 | 470.33 ± 26.63 |

TABLE 3b

| Turbidity of Cleansing Compositions (1)-(4) | | | |
|---|---|---|---|
| | Turbidity (NTU) | | |
| Cleansing Composition | 800 μL Oleic Acid | 1000 μL Oleic Acid | 1200 μL Oleic Acid |
| (1) | 133.0 ± 3.61 | 698.00 ± 156.69 | 918.00 ± 8.49 |
| (2) | 566.33 ± 85.10 | 812.33 ± 94.51 | 912.50 ± 16.26 |
| (3) | 882.675 ± 0.56 | — | — |
| (4) | 696.00 ± 41.58 | 836.33 ± 70.32 | 970.00 ± 51.96 |

As indicated in Table 3, cleansing composition (3) exhibited relatively decreased efficacy with respect to oil emulsification as compared to the remaining cleansing compositions. Particularly, cleansing composition (3) was not able to emulsify more than about 500 μL of oleic acid without exceeding 600 NTUs. Cleansing compositions (2) and (4) exhibited high levels of oil emulsification. Cleansing composition (1) exhibited the highest level of oil emulsification.

Example 4

Each of the cleansing compositions (1)-(4) of Example 1 was evaluated for its respective efficacy for foaming or foam generation and foam stability. It should be appreciated that foam is a mass of gas cells separated by thin films of liquid formed on the surface of the liquid, thereby creating a dispersion where a relatively large proportion of gas volume is dispersed in a liquid. Overall, increased foam indicates an increased perception of cleaning performance.

To evaluate foam generation, about 0.1% dilutions of each of the cleansing compositions were prepared. About 100 mL of one of the cleansing compositions (1)-(4) was poured into a vessel/container and the container was placed in a foam shaker that shook the container for 40 cycles. The amount of foam generated after shaking for 40 cycles represented the flash foam. To evaluate foam stability, a grease source, namely, whole milk, was added to the flash foam in 200 L increments. After each 200 μL increment of whole milk was added, the container was shaken for another 40 cycles and the foam volume was recorded. This process was repeated until a total of 600 μL of the whole milk was added. It should be appreciated that increased foam volume indicated increased foam stability. The results for foam generation and foam stability are summarized in Table 4.

TABLE 4

| Foam Volume of Cleansing Compositions (1)-(4) | | | | |
|---|---|---|---|---|
| | Foam Volume (mL) | | | |
| Cleansing Composition | 0 µL Milk | 200 µL Milk | 400 µL Milk | 600 µL Milk |
| (1) | 401.7 ± 14.4 | 201.7 ± 2.9 | 138.3 ± 0.0 | 125.0 ± 3.5 |
| (2) | 550.0 ± 0.0 | 255.0 ± 5.8 | 162.5 ± 5.0 | 137.5 ± 2.9 |
| (3) | 525.0 ± 17.3 | 270.0 ± 7.1 | 161.3 ± 4.8 | 136.3 ± 2.5 |
| (4) | 497.5 ± 5.0 | 178.8 ± 2.5 | 132.5 ± 2.9 | 126.3 ± 2.5 |

As indicated in Table 4, cleansing composition (2) and (3), each of with included about 27 wt % AI, exhibited relatively increased flash foam (i.e., Foam Volume at 0 µL milk) and foam stability as compared to cleansing compositions (1) and (4). Cleansing composition (2) exhibited the greatest flash foam. Cleansing composition (4) exhibited relatively greater flash foam compared to cleansing composition (1). In view of the foregoing, it was surprisingly and unexpectedly discovered that the surfactant system of cleansing compositions (2) and (4) exhibited relatively increased flash foam as compared to cleansing compositions (1) and (3). It should be appreciated that no significant differences were observed in the foam volume after the addition of milk.

Select results of the observations from Examples 1~4 are summarized in Table 5.

TABLE 5

| Cleansing Compositions (1)-(4) | | | | | | |
|---|---|---|---|---|---|---|
| Cleansing Composition | AI (wt %) | Surfactant System (wt %) | | Cloud Point (° C.) | Flash Foam (mL) | Oleic Acid @ ~600 NTUs (µL) |
| (1) | 21.25 | SLES | 10.45 | −10.8 | 401.7 | 883 |
| | | DDBS | 5.94 | | | |
| | | Betaine | 4.10 | | | |
| | | NEODOL | 0.75 | | | |
| (2) | 27.19 | SLES | 6.98 | −4.9 | 550.0 | 833 |
| | | DDBS | 15.04 | | | |
| | | LMDO | 3.17 | | | |
| | | NEODOL | 2.0 | | | |
| (3) | 27.19 | SLES | 13.38 | 10 | 525.0 | 500 |
| | | DDBS | 7.60 | | | |
| | | Betaine | 5.25 | | | |
| | | NEODOL | 0.96 | | | |
| (4) | 21.25 | SLES | 5.46 | 7 | 497.5 | 717 |
| | | DDBS | 11.75 | | | |
| | | LMDO | 2.48 | | | |
| | | NEODOL | 1.56 | | | |

It was surprisingly and unexpectedly discovered that the surfactant system of cleansing composition (2) exhibited the best performance with respect to the cloud point, flash foam, and oil emulsification, when compared to cleansing composition (4), which also included about 27 wt % AI. It was also surprisingly and unexpectedly discovered that cleansing composition (4), which included a surfactant system having the same ratio of surfactants as the surfactant system of cleansing composition (2), exhibited relatively increased performance with respect to oil emulsification and cloud point as compared to cleansing composition (3). Cleansing composition (4) also exhibited improved flash foam as compared to cleansing composition (1).

Example 5

Cleansing compositions (2) and (3) were evaluated for their respective efficacy for removing soil. Particularly, each of the cleansing compositions (2) and (3) were evaluated for soil removal according to ASTM D4488, using D4488-A2 soil. The results are summarized in Table 6.

TABLE 6

| Soil Removal for Cleansing Compositions (2) and (3) | |
|---|---|
| Cleansing Composition | % Removal of ASTM D4488-A2 Soil |
| (2) | 18.9 |
| (3) | 7.6 |

As indicated in Table 6, cleansing composition (2) removed about 2.5 times more soil as compared to cleansing composition (3).

Example 6

Cleansing compositions (2) and (3) were evaluated for their respective efficacy for cleaning plates. Particularly, each of the cleansing compositions (2) and (3) were evaluated for cleaning plates according to ASTM method D4009 using soil B. The results are summarized in Table 7.

TABLE 7

| Plate Cleaning for Cleansing Compositions (2) and (3) | |
|---|---|
| Cleansing Composition | Average Plates Cleaned |
| (2) | 13.08 |
| (3) | 11.50 |

As indicated in Table 7, cleansing composition (2) exhibited relatively increased efficacy with respect to plate cleaning as compared to cleansing composition (3).

Example 7

Cleansing compositions including the surfactant system of cleansing composition (2) were evaluated with varying amounts of one or more viscosity modifying agents to evaluate the effect on the cleansing composition. Particularly, cleansing compositions (5)-(10), each of which included the surfactant system of cleansing composition (2), were prepared by combining varying amounts of Pluronic and ethanol according to Table 8.

TABLE 7

Cleansing Compositions (5)-(10)

| Ingredient/ Component | Cleansing Compositions (5) | (6) | (7) | (8) | (9) | (10) |
|---|---|---|---|---|---|---|
| Pluronic % | 0.0 | 0.2 | 2.2 | 0.2 | 0.0 | 0.0 |
| Ethanol % | 0.0 | 0.0 | 0.0 | 2.0 | 0.2 | 2.2 |

Each of the cleansing compositions (5)-(10) were evaluated for their respective appearance, viscosity, and pH at varying time intervals. Particularly, each was evaluated at the following three time intervals: (1) Initial (e.g., Time 0); (2) after aging for about 19 hours (H) at about 5° C. and while still at about 5° C.; (3) thawed from about 5° C. to room temperature (RT) or about 25° C. for about 6 hours; and (4) thawed from 5° C. to room temperature (RT) or about 25° C. for about 18 hours. Turbidity was observed upon combining the ingredients/components, and immediately upon agitation/mixing. Viscosity was measured using a Brookfield RVT viscometer with spindle #5 at about 20 RPM and about 25° C. It should be appreciated that a viscosity of about 500 cP to about 1300 cP, such as from about 500 cP to about 950 cP, is considered sufficient for consumer perception of cleansing compositions. It should further be appreciated, as discussed above, that a relatively lower cloud point indicates improved stability, and decreased turbidity indicates increased clarity and improved consumer perception. The results are summarized in Table 8.

TABLE 8

Results of Varying Viscosity Modifying Agents in Cleansing Compositions (5)-(10)

| Ingredient/ Component | Cleansing Compositions (5) | (6) | (7) | (8) | (9) | (10) |
|---|---|---|---|---|---|---|
| Pluronic % | 0.0 | 0.2 | 2.2 | 0.2 | 0.0 | 0.0 |
| Ethanol % | 0.0 | 0.0 | 0.0 | 2.0 | 0.2 | 2.2 |
| Viscosity @ Time 0 (cP) | 1828 | 1335 | 517.5 | 562.5 | 1685 | 685 |
| Appearance @ Time 0 | Turbid | Turbid | Turbid | Clear | Turbid | Turbid |
| pH @ Time 0 | 7.56 | 7.72 | 7.66 | 7.61 | 7.6 | 7.47 |
| Appearance @ 19 H and 5° C. | Cloudy with crystals | Cloudy with crystals | Cloudy with crystals | Cloudy with crystals | Cloudy with crystals | Cloudy with crystals |
| Thawed to about 25° C. for 6 H | Cloudy with crystals | Cloudy with crystals | Cloudy with crystals | Clear Limited amount of crystals | Cloudy with crystals | Clear Full of crystals |
| Thawed to about 25° C. for 18 H | Cloudy | Cloudy | Cloudy | Clear | Cloudy | Clear |
| Turbidity (NTU) | >1000 | >1000 | 22.9 | 2.5 | >1000 | 1.61 |
| Turbidity After Mixing [NTU] | >1000 | >1000 | 897 | 1.63 | >1000 | 2.66 |

As indicated in Table 8, increasing the amount of Pluronic® as represented by cleansing compositions (5)-(7) resulted in decreased viscosity. While the viscosity of cleansing composition (7) was within the acceptable range of about 500 cP to about 1300 cP, it was observed that the turbidity of the cleansing compositions having the surfactant system of cleansing composition (2) increased with increasing amounts of Pluronic®.

As also indicated in Table 8, increasing the amount of ethanol as represented by cleansing compositions (5), (9), and (10) also resulted in decreased viscosity. While the viscosity of cleansing composition (10) was within the acceptable range, increased turbidity was also observed along with the formation of relatively large crystals after thawing.

As further indicated in Table 8, cleansing composition (8), which included a combination of ethanol and Pluronic® in an amount of about 0.2 wt % and 2 wt %, respectively, or a weight ratio of 1:10, surprisingly and unexpectedly provided a viscosity within the acceptable range while maintaining a clear solution before and after thawing. Without being bound by theory, it is believed that the combination of ethanol and Pluronic® interact synergistically to modify the viscosity and improve stability of the cleansing composition. It should be appreciated that only cleansing compositions (8) and (10) were able to recover a clear composition after cooling to about 5° C. It was also surprisingly and unexpectedly discovered that the turbidity of cleansing composition (8) decreased after mixing from about 2.5 NTU to about 1.6 NTU, which demonstrated that the appearance or clarity of the cleansing composition improved after mixing. The improved clarity was not observed in any of the other cleansing compositions.

Example 8

Cleansing composition formulations were prepared as disclosed in Table 9 below. The formulations disclosed may further optionally include excipients such as colorants, preservatives, fragrances chelating agents, polaxamers, and/or viscosity modifying agents such as ethanol. Formulation (12) (pH 8.0), which uses lactic acid as a pH adjuster in lieu of sulfuric acid and which has a decreased amount of DDBS combined with an increased amount of SLES as compared to Formulation (11), exhibited superior Cold Weather Stability performance, having stability without precipitation of solids, e.g., sulfates. Moreover, Formula (14) (pH 3.2-3.4), which also uses lactic acid as a pH adjuster in lieu of sulfuric acid and has a decreased amount of DDBS compared to an increased amount of SLES as compared to Formulation (13), was shown to be stable after 24 hours at −4° C., while Formula (13) was not.

TABLE 9

Sample formulations

| Ingredient/Component | Cleansing Composition (11) Wt. % | (12) Wt. % | (13) Wt. % | (14) Wt. % |
|---|---|---|---|---|
| Sodium laureth sulfate 1EO - 70% | 9.97 | 14.11 | 6.58 | 8.47 |
| $SO_3$ NA DDB High AI (52.5%) Base-MMW (DDBS) | 30.55 | 22.16 | 9.45 | 7.56 |
| LMDO | 10.56 | 10.56 | — | — |
| Betaine | — | — | 2 | 2.0 |
| Neodol ® 91-8 | 1.0 | 2.0 | 2.28 | 2.28 |
| Lactic acid 88% | — | 0.25 | 0.54 | 1.64 (to pH 3.2-3.4) |
| Sulfuric acid | 0.023 | — | 0.1 | -- |
| Water and other excipients | QS | QS | QS | QS |
| Total | 100 | 100 | 100 | 100 |
| Total anionic surfactant (DDBS + SLES) | 23 | 22 | 16.03 | 16.03 |
| Total AI | 28 | 27 | 20.3 | 20.3 |
| Ratio total anionic:non-ionic surfactant | 23 | 11 | 7 | 7 |
| Ratio total anionic:amphoteric | 7 | 6 | 8.015 | 8.015 |

Robustness of the Compositions (13) and (14) was tested by varying the pH of the DDBS and SLES and comparing the two compositions. As shown in Table 10 below, the results demonstrated that Composition (13) is unstable (i.e., in two separate phases after 24 hours at −4° C. and having high cloud points) across all pH ranges studied. To the contrary, Composition (14), using solely lactic acid as a pH modifying agent, is homogenous in one phase after 24 hours at −4° C. and presents low cloud points. This indicates that Composition (14) is more robust than Composition (13) and that it is better able to resist the variability that may present in the use of raw materials SLES and/or DDBS.

TABLE 10

Comparison of Compositions with Varying Raw Material pHs

| Comp. | pH DDBS | pH SLES | Solids % 25° C. | Solids % 5° C. | delta Solids | Cloud Point ° C. | # Phases after 24 hrs/−4° C. |
|---|---|---|---|---|---|---|---|
| (14) | 12.2 | 9.5 | 0.410 | 0.820 | 0.410 | −7.6 | 1 |
| (14) | 10.9 | 9.5 | 0.719 | 0.820 | 0.101 | −7.5 | 1 |
| (14) | 10.9 | 11.6 | 0.392 | 0.667 | 0.275 | −7 | 1 |
| (13) | 10.9 | 7.4 | 0.306 | 1.117 | 0.811 | 12 | 2 |
| (13) | 9.6 | 11.6 | 0.605 | 1.190 | 0.585 | 11.5 | 2 |
| (13) | 12.2 | 11.6 | 0.361 | 1.008 | 0.647 | 8.5 | 2 |
| (14) | 9.6 | 7.4 | 0.535 | 0.551 | 0.016 | −6.4 | 1 |
| (13) | 12.2 | 7.4 | 0.497 | 1.044 | 0.547 | 11 | 2 |
| (13) | 10.9 | 9.5 | 0.365 | 1.049 | 0.684 | 10.6 | 2 |
| (13) | 12.2 | 11.6 | 0.290 | 0.892 | 0.602 | 8 | 2 |
| (14) | 12.2 | 7.4 | 0.659 | 0.699 | 0.040 | −7.2 | 1 |
| (13) | 9.6 | 9.5 | 0.339 | 0.748 | 0.408 | 8 | 2 |
| (14) | 9.6 | 7.4 | 0.321 | 0.640 | 0.320 | −7.6 | 1 |
| (14) | 9.6 | 11.6 | 0.291 | 0.715 | 0.424 | −7.6 | 1 |

Additionally, the contact angle was measured for a drop of on a flat surface, using a Drop Shape Analyzer DSA25 (Krüss), wherein beef tallow colored with Sudan Red was soiled on a melamine tile. The lower and the faster the contact angle is reduced, the better the indication of wetting a soiled surface is, which may also be an indicator of better cleaning performance. The contact angle was measured on a flat surface, and the measurements were carried out at room temperature. The contact angles for a control (water), Composition (13), and Composition (14) were measured. For Composition (14), the contact angle was initially below 90° and quickly decreased between 0-30 seconds, continuing to decrease along the tested time (300 seconds) as compared to the control, in which the contact angle did not decrease below 90°. The contact angle for Composition (14) likewise decreased faster and to a greater degree than for Composition (13).

The present disclosure has been described with reference to exemplary implementations. Although a limited number of implementations have been shown and described, it will be appreciated by those skilled in the art that changes may be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. An aqueous cleansing composition, comprising:
an aqueous base; and
a surfactant system comprising sodium lauryl ether sulfate (SLES), sodium dodecyl benzene sulfonate (DDBS), lauramidopropyl betaine or lauramidopropylamine oxide, and a reaction product of a C9-C15 or a C9-C11 alkanol and 2.5 to 10 moles of ethylene oxide,
wherein the surfactant system is present in an amount of from 18 wt % to 29 wt % based on the total weight of the aqueous cleansing composition,
wherein the aqueous cleansing composition has a viscosity measured at 25° C. of from 500 cP to 1300 cP.

2. The aqueous cleansing composition of claim 1, wherein the surfactant system is present in an amount of from 20 wt % to 29 wt %, based on the total weight of the aqueous cleansing composition.

3. The aqueous cleansing composition of claim 1, wherein the surfactant system is present in an amount of from 22 wt % to 29 wt %, based on the total weight of the aqueous cleansing composition.

4. The aqueous cleansing composition of claim 1, wherein the surfactant system further comprises an alkyl sulfonate other than DDBS, an alkyl ethoxy sulfate other than SLES, or a salt thereof, or a combination thereof.

5. The aqueous cleansing composition of claim 1, wherein the surfactant system is present in an amount of from 24 wt % to 29 wt %, based on the total weight of the aqueous cleansing composition.

6. The aqueous cleansing composition of claim 1, wherein the surfactant system is present in an amount of from 26 wt % to 28 wt %, based on the total weight of the aqueous cleansing composition.

7. The aqueous cleansing composition of claim 1, wherein DDBS and SLES are present in an amount of from 16 wt % to 26 wt %, based on the total weight of the aqueous cleansing composition.

8. The aqueous cleansing composition of claim 7, wherein the DDBS is present in an amount of from 6 wt % to 18 wt %, based on the total weight of the aqueous cleansing composition.

9. The aqueous cleansing composition of claim 7, wherein the SLES is present in an amount of from 6 wt % to 12 wt %, based on the total weight of the aqueous cleansing composition.

10. The aqueous cleansing composition of claim 1, wherein the surfactant system further comprises a betaine-based surfactant other than lauramidopropyl betaine, an amine oxide surfactant other than lauramidopropylamine oxide, or a combination thereof.

11. The aqueous cleansing composition of claim 1, wherein the lauramidopropyl betaine and/or lauramidopropylamine oxide are present in an amount of from greater than 0 wt % to 6 wt %, based on the total weight of the aqueous cleansing composition.

12. The aqueous cleansing composition of claim 1, wherein the reaction product of a C9-C15 or a C9-C11 alkanol and 2.5 to 10 moles of ethylene oxide comprises a reaction product of a C9-C11 alkanol ethoxylated and 8 moles of ethylene oxide.

13. The aqueous cleansing composition of claim 1, wherein the reaction product of a 09-C15 or a C9-C11 alkanol and 2.5 to 10 moles of ethylene oxide is present in an amount of from greater than 0 wt % to 4 wt %, based on the total weight of the aqueous cleansing composition.

14. The aqueous cleansing composition of claim 1, wherein the surfactant system consists of sodium lauryl ether sulfate (SLES), sodium dodecyl benzene sulfonate (DDBS), lauramidopropyl betaine, and a reaction product of a C9-C11 alkanol ethoxylated and 8 moles of ethylene oxide in a weight ratio of about 5:6:2:1; or wherein the surfactant system consists of sodium lauryl ether sulfate (SLES), sodium dodecyl benzene sulfonate (DDBS), lauramidopropylamine oxide, and a reaction product of a C9-C11 alkanol ethoxylated and 8 moles of ethylene oxide in a weight ratio of about 5:6:2.1.

15. The aqueous cleansing composition of claim 1, further comprising a plurality of viscosity modifying agents, the viscosity modifying agents comprising ethanol, a poloxamer, or a combination thereof.

16. The aqueous cleansing composition of claim 15, wherein the ethanol is present in an amount of from 1 wt % to 3 wt %, based on the total weight of the cleansing composition.

17. The aqueous cleansing composition of claim 15, wherein the poloxamer is present in an amount of from 0.01 wt % to 1 wt %, based on the total weight of the cleansing composition.

18. The aqueous cleansing composition of claim 15, wherein the ethanol and the poloxamer are present in a weight ratio of from 4:1 to 6:1.

19. The aqueous cleansing composition of claim 1, further comprising lactic acid as a pH modifier.

20. A method for preparing the aqueous cleansing composition of claim 1, the method comprising contacting the aqueous base and the surfactant system with one another.

* * * * *